July 5, 1949.  H. G. WHITMORE  2,475,558
CUTTING MACHINE
Filed Sept. 2, 1944  2 Sheets-Sheet 1

Inventor:
HENRY G. WHITMORE
BY Kimmel & Crowell
Attorneys

July 5, 1949.  H. G. WHITMORE  2,475,558
CUTTING MACHINE
Filed Sept. 2, 1944  2 Sheets-Sheet 2
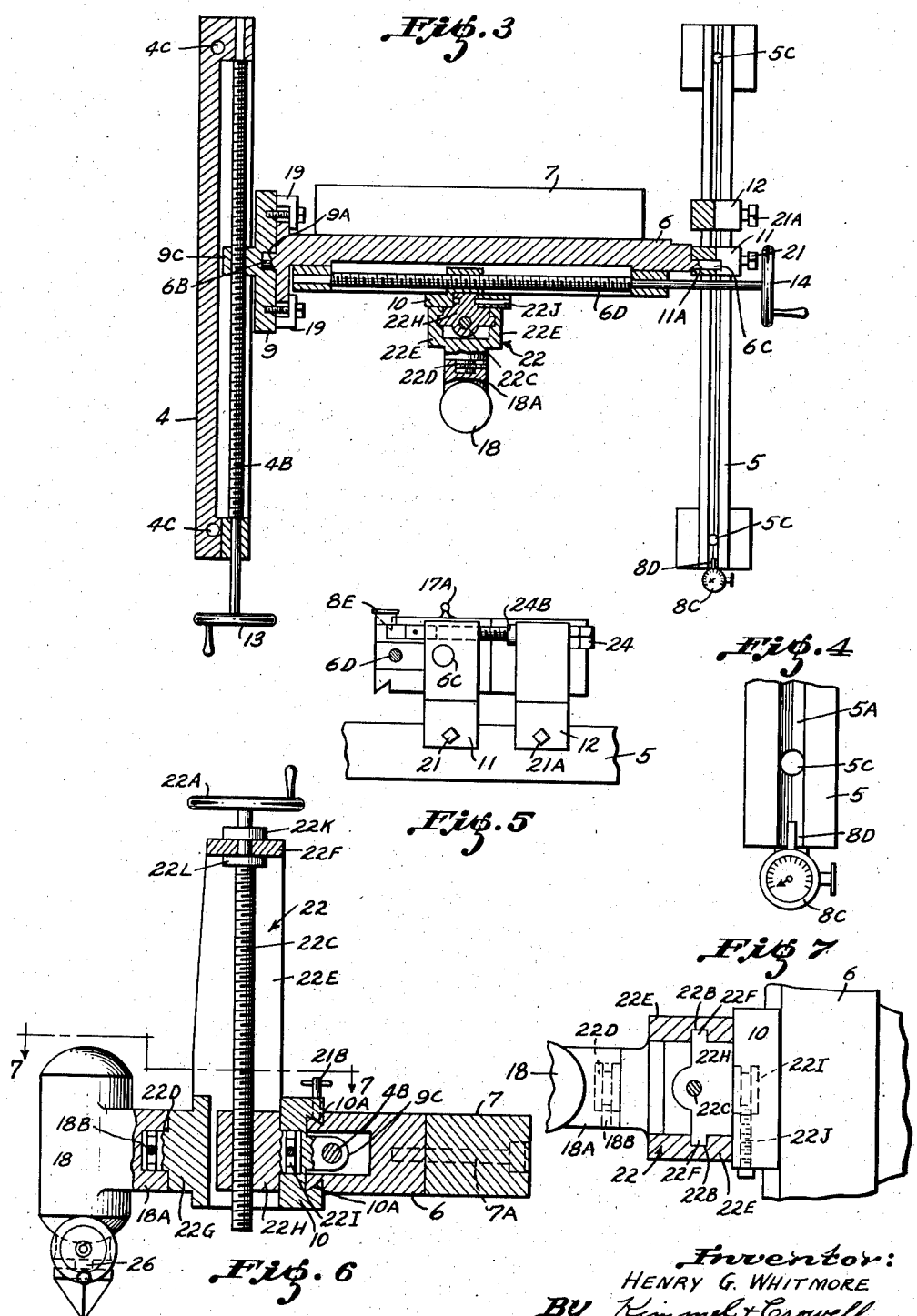
Inventor:
HENRY G. WHITMORE
By Kimmel & Crowell
Attorneys Patented July 5, 1949

2,475,558

UNITED STATES PATENT OFFICE 2,475,558

CUTTING MACHINE

Henry G. Whitmore, Newburyport, Mass.

Application September 2, 1944, Serial No. 552,463

4 Claims. (Cl. 77—1)

This invention relates to a machine for accurately performing any type of work operation that can be performed by a rotating tool, as for example, drilling, boring, counterboring, and like operations.

These operations are usually performed on a jig-borer or other suitable machine which as conventionally constructed usually consists of a vertical column and base combined which supports a tool spindle, and a work table adjustable both longitudinally and transversely relative to the tool spindle support. The adjustment and movement of this work table is wholly dependent upon how square the machine ways are and how long they remain square. Inasmuch as any variation in these surfaces will cause a reflection of such variation in the work, the conventional jig-borer or other suitable machine is not always accurate for all work operations, and moreover the range of such machine is severely limited by the circumstances that the work must be brought to the machine and mounted on the work table.

The broad object of my invention is to avoid the disadvantages of conventional machines by providing a machine in which at all times the different adjustments or movements are under positively accurate control. This enables my machine to accurately handle a much greater range and capacity of work than can be handled on existing machines.

Other objects and advantages will appear as this description proceeds.

In the drawings:

Fig. 3 is a transverse sectional view on the line 3—3 of Fig. 1,

Fig. 4 is an enlarged, fragmentary portion of a part of the machine and showing a dial-type measuring device mounted thereon, Fig. 5 is an enlarged, fragmentary side view of the beam locking and beam adjusting mechanism of my improved machine, Fig. 6 is an enlarged, vertical sectional view on the line 6—6 of Fig. 1, and Fig. 7 is a longitudinal sectional view on the line 7—7 of Fig. 6.

Figure 1:
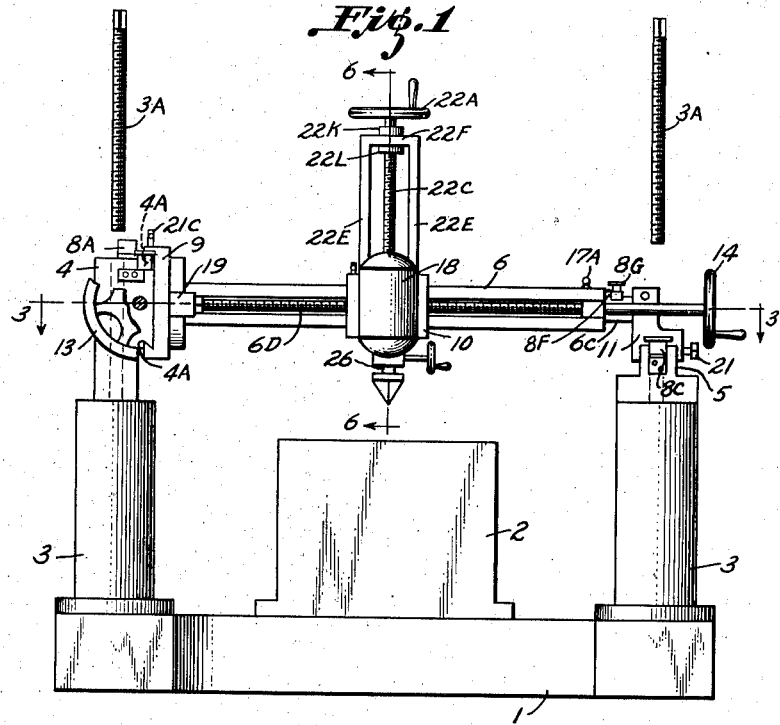
Fig. 1 is a front end view of my machine.

My machine comprises a base 1 from which rises a work table 2 and four upright hollow columns 3 at the four corners of the base.

Rigidly mounted on columns 3 is a pair of spaced substantially parallel beams 4 and 5, which extend longitudinally above the work and adjustably support a transverse beam 6 carrying a motor-driven rotatable tool spindle 26 which is preferably mounted on said beam 6 for both vertical and rotatable angular adjustment relative thereto. The upper or top face of the beam 4 has removably secured thereto a stop member 16 adapted to cooperate with a second stop member to be hereinafter described, to assist in the proper setting or adjustment of the machine. The said upper face of beam 4 is also provided with a ball-point 17 near the rear end thereof as viewed in Fig. 2. The upper or top face of the beam 6 is provided with a ball point 17A, between which and the ball point 17 a testing rod 17B of predetermined fixed length may be placed to insure proper angular relationship between the axis of beam 4 and the axis of beam 6, it being understood that the testing rod 17B is temporarily disposed between the ball points 17 and 17A during the testing operation necessary to insure the proper right-angular relation between the axes of the beams 4 and 6 and during the time when the stop 16 is fully engaged by a stop associated with beam 6, all in a manner to be hereinafter more fully described.

One of the main advantages of my machine is that it may be used upon any type of foundation, other than its own base, as for example, to perform varied work on board ship or elsewhere, regardless of either the dimensions of the work or the angle at which the work may be resting.

To accomplish this, I provide a vertical jack screw 3A of any desired length adapted for insertion within internally threaded holes extending vertically through beams 4 and 5 at each of the four corners of the machine. These screws are threaded into holes 4C and 5C extending vertically through the longitudinal beams 4 and 5 near the ends thereof. The lower ends of these screws react against any support when the beams 4, 5 and 6 and the parts carried thereby are removed from the four columns 3 and are placed upon a suitable supporting surface, and depending upon the direction in which the screws are turned, will raise or lower said beams, as the case may be.

Should the work to be operated upon present a surface which is not level, the screws 3A are adjusted until the beams 4, 5 and 6 are indicated as parallel with such surface. In such uses, the elements 1, 2 and 3 are not needed and hence would not be used, as the screws are long enough to provide a certain distance of elevation which can readily be augmented by blocking under them to any desired height.

Beam 6 is adjustable longitudinally along beams 4 and 5, and is also capable of being rotated angularly to a limited extent, say through approximately 90° around a horizontal axis at right angles to beam 4, i. e., about the axis of beam 6.

To accomplish the longitudinal adjustment of beam 6, beam 4 is provided with a pair of V-slots 4A constituting a dovetail along the entire length of the inner face of beam 4, to which dovetail is gibbed and fitted a slide 9 to which the beam 6 is pivotally connected for limited rotation about its axis in a manner to be hereinafter described. Slide 9 contains a threaded nut 9C within which fits a feed screw 4B operated by a hand wheel 13. By turning this screw, slide 9 and with it the beam 6 is caused to travel longitudinally along beam 4. The side of slide 9 opposite to that to which the beam 6 is pivotally attached, is provided with a stop 15 bolted or otherwise rigidly secured to the said slide 9, this stop being adapted to contact stop 16 when said last-mentioned stop is positioned on the upper face of beam 4 during the setting or adjusting of the machine in a manner to be hereinafter described. A locking screw 21C extends through the upper portion of slide 9 with the lower end of said screw bearing on the surface of the upper groove 4A or on the surface of the gib which engages said groove, this locking screw serving to rigidly secure the slide in adjusted position along the length of beam 4 and being capable of release to permit said slide 9 to be moved back and forth along said beam 4.

The outer end of beam 6 is supported by, and pivotally mounted in, bearing block 11 which is channeled along its lower edge to slidably fit beam 5, the width of the space between the side walls defining said channelled portion being slightly in excess of the width of the beam 5 to permit said block 11 to slide along the length of said beam. The movement of said block along said beam 5 approximately follows the longitudinal movement of slide 9 as imparted by feed screw 4B, and said block is locked in its adjusted position by means of set screw 21.

To accomplish the rotative adjustment of beam 6 about its longitudinal axis, said beam has a journal 6B at its inner end adapted to fit within a bearing 9A in slide 9 (see Fig. 3) and at its outer end said beam 6 is provided with a journal 6C which is received within a bearing 11A in the bearing block 11 (see Fig. 3).

The position of block 11 longitudinally of beam 5 is controlled by an adjusting block 12 which, like block 11, is channeled along its lower edge to slidably fit beam 5 and is locked in any desired position therealong by means of set screw 21A.

Block 11 is adjustable for relatively short distances with respect to block 12 and along the length of beam 5 by means of screw 24 which is freely rotatable within block 12 and which is locked against axial movement within said block by means of a collar 24B pinned to said bolt at the side of block 12 opposite the head of screw 24, whereby the screw 24 may be rotated but is held against axial movement. The threaded end of screw 24 engages within an internally-threaded bore in the bearing block 11, it being obvious that rotation of the screw 24 will vary the distance between blocks 11 and 12. When it is desired to move block 11 and the outer end of beam 6 journaled thereon, set screw 21 of block 11 is loosened, set screw 21A is tightened, and screw 24 is rotated in the direction necessary to increase the space or decrease the space between the inner, adjacent faces of these two blocks. By turning screw 24 in the proper direction block 11, and with it the outer end of beam 6, may be forced to travel along beam 5 for a relatively short distance until the axis of said beam 6 is square with the axis of beam 4, after which block 11 is locked in its adjusted position by means of set screw 21.

In order to permit longitudinal adjustment of spindle 26 along beam 6 and transversely with respect to beams 4 and 5, I provide beam 6 with a pair of V slots 6A, one of said slots extending along each of the upper and lower faces of the said beam near the front face thereof and constituting a dovetail extending the length of said beam, which dovetail is gibbed to and fits within, a dovetail slot 10A in the head 10 of a slide 22. Adjustment of head 10 on beam 6 is accomplished by feed screw 6D, operated by a hand wheel 14, and such adjustment is held by a clamp screw 21B. The slide 22 comprises spaced, parallel, vertically-extending side members 22E, connected at their upper ends by cross member 22F, and connected at their lower ends by cross member 22G.

In order to permit vertical adjustment of spindle 26 relative to the work, the inner, opposed faces of side members 22E are each provided with vertically extending grooves 22B (Fig. 7), which are engaged by ribs 22F carried at the sides of a block 22H having an internally-threaded bore parallel to the ribs 22F, said block 22H having a circumferentially grooved journal 22I disposed within an opening in the face of slide 10 and retained therein by means of a screw-pin 22J, whereby the block 22H may rotate about its pivotal mounting in slide 10 and may be locked in any desired position by means of the screw pin or bolt 22J. The longitudinal feed of slide 22 and of the parts carried thereby may be had through a feed screw 22C operated by a hand wheel 22A, which feed screw is free to rotate within an opening in cross member 22F and is prevented from axial movement within said cross member by suitable washers 22K and 22L disposed above and below the cross member 22F and pinned or otherwise secured to said feed screw.

Slide 22 may be adjusted through 360° relative to head 10. Such adjustment may be held by the locking screw 22J, the inner end of said screw extending into the groove in the journal 22I and being movable into rigid contact with the base of said groove when it is desired to retain the slide 22 in adjusted angular position with respect to the block 10. The cross member 22G of slide 22 is provided with a circumferentially-grooved journal 22D which fits within a bearing 18A on the adjacent face of the motor housing 18 of the tool spindle. A locking pin or screw 18B has its inner end extending into the groove in journal 22D, and said locking pin or screw 18B may be moved inwardly into firm contact with the bottom wall of the groove to lock the motor housing in its adjusted angular position with respect to the slide 22. This enables spindle 26 to be adjusted through 360° relative to slide 22. Instead of employing the grooved journal 22D and locking pin or screw 18B, the adjustment may be held by any conventional means such as T-bolts and slots, or the like.

Adjustment of the spindle 26 about the axis of the beam 6 is had through the fact that beam 6 is provided at its ends with the journals 6B and 6C which permit said beam to be rotated in the bearings 9A and 11A, the extent of such rotation being limited to approximately 90°, due to the contact between feed screw 6D and the top wall of block 11, i. e., the beam 6 is readily rotatable to and from a position shown in Fig. 5 to and from a position where the screw 6D would contact the top surface of block 11. This adjustment is held by clamps and clamp screws indicated generally at 19 in Figs. 1, 2 and 3. The weight of members 10, 22 and 18 may be counterbalanced by a counterweight 7 secured to the rear face of beam 6 by bolts 7A.

In adjusting my machine for a conventional work operation, I first check the machine to make sure that both longitudinal beams 4 and 5 are the proper height above the base or work, as the case may be, and that transverse beam 6 is properly squared with respect to the beams 4 and 5, i. e., that the axis of beam 6 is exactly normal to the axis of beams 4 and 5.

After loosening the lock screw 21 of block 11, loosening lock screw 21A of block 12, and loosening lock screw 21C of block 9 I then adjust transverse beam 6 longitudinally with respect to the beam 4 until stops 15 and 16 contact each other. Stop 15 is carried by the block 9 as previously explained, and has its stop surface, i. e., the surface adapted to contact stop 16, located preferably on the center line of the beam 6. Stop 16 is removably located on the upper face of beam 4 as previously explained, and has its stop surface disposed for contact by the stop surface of stop 15. When the beam 6 is moved along the beams 4 and 5 to a position where stops 15 and 16 are in contact, I next lock the slide 9 at the inner end of beam 6 to beam 4 by means of a lock screw 21C or the like, and then lock adjusting block 12 to the beam 5 by means of clamp screw 21A. Then, by means of screw 24, I move the block 11 and with it the outer end of beam 6 until a test rod of predetermined fixed length, such as the rod 17B, will exactly fit between the opposed surfaces of the fixed ball points 17 and 17A upon beams 4 and 6, respectively. Rod 17B forms the hypotenuse, minus one-half the diameter of each ball point, of a predetermined right triangle. This insures that the axes of beams 4 and 6 will be at right angles to each other, i. e., square with one another, because ball point 17A is preferably located on the center line of beam 6, i. e., on the top surface of said beam in a plane passing through the axis of said beam 6, as is also stop 15.

When squaring up the machine by establishing an exact right triangle by bringing the stops 15 and 16 in contact and by inserting the test rod 17A between ball points 17 and 17A it will be apparent that the base of such triangle is parallel to the axis of longitudinal beam 4, that one leg is parallel to the axis of transverse beam 6, and that the hypotenuse of said triangle is established by the center distance between the two ball points 17 and 17A. The three sides of this right triangle are of the proper ratio to one another, thus insuring that the axis of beam 6 will be perfectly square with the axis of beam 4. In a machine made in accordance with my present invention, the hypotenuse of the above referred to triangle is 40″ long and the legs are 24″ and 32″, respectively. Thus the square of the hypotenuse exactly equals the sum of the squares of the other two sides.

Stops 15 and 16, test rod 17B, and ball points 17 and 17A, should all be in light contact to complete the squaring up of the machine. Inasmuch as any movement of one relative to the other is likely to alter the preliminary adjustment, these adjustments should be repeatedly checked until perfect contact of said elements is obtained.

The machine is constructed with conventional sliding clearance between the slide 9 and the beam 4 and between the block 11 and the beam 5. Therefore, when the beam 6 is moved along the longitudinal beams 4 and 5 by operation of the feed screw 4b which engages only the slide 9, the inherent tendency will be for the opposite end of the beam 6 to lag behind in this movement thus destroying the right angular relationship between the axis of beams 4 and 6. It is the object of this invention then to provide means for adjusting the beam 6 back to the right angular relationship originally achieved.

While the above described method of forming the right triangle is preferable, it is evident that the ball points and the stops might be located in other positions so long as their location will compel the axes of beams 4 and 6 to be square with each other.

To make sure that squareness is maintained during the subsequent operation of the machine, I mount a test indicator device upon the forward outer end of beam 4. As shown, this test indicator device consists of one or more conventional end measuring rods of well known type, adapted to be placed in slot 4A on the upper surface of beam 4, and a dial indicator 8A placed at the front end of beam 4 with the spring-actuated plunger 8B of said dial indicator projecting for a short distance into and above the walls defining the slot 4A, but other measuring devices may be used, as for example, a scale and vernier might be substituted for the indicator 8A and end measuring rods. The necessary length of end measuring rods, including, if desired, an inside micrometer, is now placed in slot 4A to extend from the end of the spring-actuated plunger 8B to the front face of the block 9 and to completely and accurately fill the space between the end of said plunger and said block.

Dial indicator 8A is now adjusted to zero by actuation of the bezel of said indicator. The same end measuring rods, or a measuring rod or rods equal or equivalent to the total length thereof, which formerly were resting in V-slot 4A of beam 4 are now placed in V-slot 5A of beam 5, to which is added a relatively short end measuring rod of a length equal to the difference in distance between the front face of slide 9 and the axis of beam 6, minus the distance between the front face of block 11 and the axis of beam 6. A second dial indicator 8C, which is movably mounted on the upper or top surface of the beam 5 at the forward end of slot 5A and has its spring-actuated plunger 8D extending within and slightly above the walls defining the slot 5A, this entire indicator 8C being movable longitudinally along beam 5 and is retained in a desired position along said beam by any suitable means (not shown). After the end measuring rods formerly in slot 4A have been transferred to, and placed within slot 5A and the additional length of rod has been inserted as above described, the assembly of rods within said slot 5A is moved to a position where its inner end abuts the forward side face of block 11, after which the dial indicator 8C is moved inwardly until the inner end of the spring-actuated plunger 8D thereof contacts the outer end of the rods in slot 5A whereupon the indicator is set to zero. The ends of beam 6 are now positively located, so that the stop 16 may now be removed from the machine so as not to interfere with subsequent movements of beam 6 along beams 4 and 5. The test rod 17B previously positioned between the ball-points 17 and 17A is now removed from position. The end measuring rods which were transferred from slot 4A to 5A are now removed from slot 5A.

From this point on, any longitudinal movement of beam 6 may be kept perfectly square by using the same end measuring rods and/or an inside micrometer in slots 4A and 5A, and moving these rods from one slot 4A to the other 5A while keeping the additional rod always in the slot 5A of beam 5, after the measurement has been taken in the first slot 4A, all as above described, it being noted that the "additional" rod above referred to is of a length equal to the difference in distance between the front face of slide 9 and the axis of beam 6, minus the distance between the front face of block 11 and the axis of said beam 6.

Figure 2:
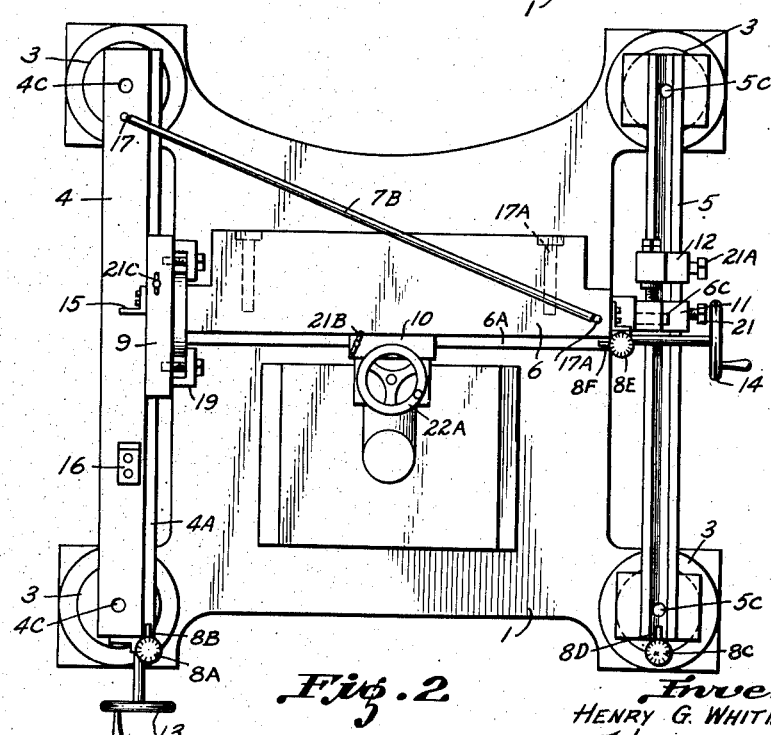
Fig. 2 is a top plan view thereof.

The transverse movement of the sliding head 10 is controlled by the use of end measuring rods, indicator 8E, or other conventional devices in the conventional manner, the top and bottom faces of beam 6 being provided with V slots 6A which extend for the entire length of the beam and are parallel to its axis, said slots being of substantially V shape and forming on the front face of beam 6 a dovetail adapted to slidably receive the correspondingly dovetailed slide 10, the uppermost of said slots also adapted to receive an end measuring rod or a series of such rods which may be disposed in said slot to extend between the surface of the right side of block 10, as viewed in Figs. 1 and 2, and the spring-actuated plunger 8F of the dial indicator 8E.

Various modifications in the construction and mode of operation of my machine may obviously be resorted to within the spirit and scope of my invention as defined by the appended claims.

What I therefore claim and desire to secure by Letters Patent is:

1. A machine tool comprising a pair of longitudinal beams disposed in spaced apart parallel relationship to each other, a transverse cross-beam slidably carried at the opposite ends thereof by said pair of longitudinal beams, a rotatable spindle adjustably carried by said cross-beam, screw means operatively connected to one end of said cross-beam for slidably moving said cross-beam relative to said pair of longitudinal beams, clamping means carried by said one end of said cross-beam for locking said one end relative to the adjacent one of said pair of longitudinal beams, means carried by the other of said pair of longitudinal beams and connected to the opposite end of said cross-beam for effecting limited adjustment of said opposite end independently of said screw means, first measuring means carried by said first longitudinal beam for indicating the position of said one end of said cross-beam relative to said first longitudinal member, second measuring means carried by said other longitudinal beam for indicating the position of said opposite end of said cross beam relative to said other longitudinal beam, third measuring means carried by said cross-beam for indicating the position of said spindle relative to said cross-beam, and checking means engageable between said cross-beam and said first longitudinal beam for preliminarily checking the squareness of said cross-beam relative to said first longitudinal beam at one position of said cross-beam, whereby said clamping means, said means carried by said other longitudinal beam and connected to said opposite end, and said checking means are effective to preliminarily set said cross-beam square relative to said first longitudinal beam; said first and second measuring means, said clamping means, and said means carried by said other longitudinal beam and connected to said opposite end provide means for adjusting said cross-beam square to said first longitudinal beam at all subsequent positions of said cross-beam; and whereby, said first and third measuring means provide means for spotting said rotatable spindle relative to the work piece.

2. A machine tool comprising a pair of longitudinal beams disposed in spaced apart parallel relationship to each other, a transverse cross-beam slidably carried at the opposite ends thereof by said pair of longitudinal beams, a rotatable spindle adjustably carried by said cross-beam, screw means carried by one of said longitudinal beams engaging the related end of said cross-beam for slidably moving said cross-beam relative to said pair of longitudinal beams, means carried by the other of said pair of longitudinal beams and connected to the opposite end of said cross-beam for effecting limited longitudinal adjustment of said opposite end relative to said pair of longitudinal beams independently of said screw means, checking means engageable between said cross-beam and said first longitudinal beam for preliminarily checking the squareness of said cross-beam relative to said first longitudinal beam at one position of said cross-beam, measuring means carried by each of said pair of longitudinal beams for indicating the position of the related ends of said cross-beam relative to said pair of longitudinal beams, other measuring means on said cross-beam for indicating the position of said spindle relative to said cross-beam, whereby said checking means and said means for effecting limited adjustment of said opposite end of said cross-beam provide means for preliminarily squaring said cross-beam relative to said first longitudinal beam at one position of said cross-beam; said measuring means carried by said pair of longitudinal beams, and said means for effecting limited adjustment of said opposite end of said cross-beam provide means for adjusting said cross-beam square to said first longitudinal beam at all subsequent positions of said cross-beam; and whereby, said measuring means on said first longitudinal beam and said measuring means carried by said cross-beam provide means for both longitudinal and lateral spotting of said rotatable spindle.

3. The machine tool of claim 1, wherein said means carried by the other of said pair of longitudinal beams for effecting limited adjustment of said opposite end of said cross-beam consists of a bearing block slidably carried by said other longitudinal beam and supporting said opposite end, an adjusting block also slidably carried by said other longitudinal beam, clamping means for locking said adjusting block relative to said other longitudinal beam, and an adjusting screw rotatably carried by said adjusting block and threadedly engaging said bearing block, whereby when said adjusting block is locked relative to said other longitudinal beam, said screw provides means for adjusting said bearing block and said opposite end of said cross-beam relative to said other longitudinal beam.

4. A machine tool comprising a first longitudinal beam and a second longitudinal beam disposed in spaced apart parallel relationship to each other, a transverse cross-beam slidably carried at the opposite ends thereof by said longitudinal beams, a rotatable spindle carried by said cross-beam and adjustable along the length thereof, screw means on said first longitudinal beam threadedly engaging one end of said cross-beam for slidably moving said cross-beam relative to said longitudinal beams, checking means for initially checking the squareness of said cross-beam relative to said first longitudinal beam at one position thereof, said checking means consisting of a stop on said first longitudinal beam and a stop on said cross-beam for contact with each other in one position of said cross-beam, a fixed measuring point on said first longitudinal beam, a fixed measuring point on said cross-beam, and a measuring rod for engagement between said fixed measuring points of such length as to complete the hypotenus of a right angled triangle of which the shortest line from the fixed measuring point on said first longitudinal beam to the contact surface of said stops constitutes one leg and the line from the fixed measuring point on said cross-beam to the point where said first line intersects said contact surface constitutes the other leg, adjusting means carried by said second longitudinal beam and connected to the opposite end of said cross-beam for effecting limited adjustment of said opposite end independently of said screw means, measuring means on each of said longitudinal beams for indicating the position of the opposite ends of said cross-beam relative to said longitudinal beams, and measuring means on said cross-beam for indicating the position of said spindle relative to said cross-beam, whereby said checking means and said adjusting means provide means for initially squaring said cross-beam relative to said first longitudinal beam at one position of said cross-beam; said measuring means on each of said longitudinal beams and said adjusting means provide means for adjusting said cross-beam square relative to said first longitudinal beam at all subsequent positions of said cross-beam; and, said measuring means on said first longitudinal beam and on said cross-beam provide means for spotting said spindle.

HENRY G. WHITMORE.

REFERENCES CITED

The following references are of record in the file of this patent:

UNITED STATES PATENTS

| Number | Name | Date |
| --- | --- | --- |
| 182,837 | Macomber | Oct. 3, 1876 |
| 480,040 | Saylor | Aug. 2, 1892 |
| 1,022,051 | Shanks | Apr. 2, 1912 |
| 1,256,072 | Stevenson | Feb. 12, 1918 |
| 1,408,428 | Anderson | Mar. 7, 1922 |
| 1,424,988 | Coughtry | Aug. 8, 1922 |
| 2,081,288 | Armitage | May 25, 1937 |
| 2,167,189 | Verderber | July 25, 1939 |
| 2,249,121 | Drescher | July 15, 1941 |

FOREIGN PATENTS

| Number | Country | Date |
| --- | --- | --- |
| 261,985 | Great Britain | Dec. 2, 1926 |